(12) United States Patent
Fuse et al.

(10) Patent No.: US 10,618,373 B2
(45) Date of Patent: Apr. 14, 2020

(54) HEAT EXCHANGER

(71) Applicant: DENSO CORPORATION, Kariya, Aichi-pref. (JP)

(72) Inventors: Takuya Fuse, Kariya (JP); Yasushi Kono, Kariya (JP); Shinya Kasamatsu, Kariya (JP)

(73) Assignee: DENSO CORPORARTION, Kariya, Aichi-pref. (JP)

( * ) Notice: Subject to any disclaimer, the term of this patent is extended or adjusted under 35 U.S.C. 154(b) by 25 days.

(21) Appl. No.: 15/303,906

(22) PCT Filed: May 8, 2015

(86) PCT No.: PCT/JP2015/002345
§ 371 (c)(1),
(2) Date: Oct. 13, 2016

(87) PCT Pub. No.: WO2015/177977
PCT Pub. Date: Nov. 26, 2015

(65) Prior Publication Data
US 2017/0036507 A1    Feb. 9, 2017

(30) Foreign Application Priority Data

May 23, 2014   (JP) .................................. 2014-106784

(51) Int. Cl.
*B60H 1/00* (2006.01)
*F28D 20/02* (2006.01)
(Continued)

(52) U.S. Cl.
CPC ......... *B60H 1/005* (2013.01); *B60H 1/00335* (2013.01); *C09K 5/066* (2013.01);
(Continued)

(58) Field of Classification Search
CPC .... F28D 1/05383; F28D 20/02; F28D 20/021; F28D 20/025; F28D 20/056;
(Continued)

(56) References Cited

U.S. PATENT DOCUMENTS 5,826,650 A * 10/1998 Keller ................. F24D 11/0257
165/236
6,854,286 B2 * 2/2005 Bureau .............. B60H 1/00321
62/244
(Continued)

FOREIGN PATENT DOCUMENTS

| JP | 2010163510 A | * | 7/2010 |
| JP | 2011058678 A | * | 3/2011 |
| JP | 2014020758 A |   | 2/2014 |

OTHER PUBLICATIONS

Machine Traslation of JP 2010163510 A, retrieved Jan. 17, 2018.*

*Primary Examiner* — Eric S Ruppert
*Assistant Examiner* — Hans R Weiland
(74) *Attorney, Agent, or Firm* — Harness, Dickey & Pierce, P.L.C.

(57) ABSTRACT

A heat exchanger has (i) a first passage in which a first fluid flows, (ii) a heat storage body that is thermally connected to the first passage and stores a warm heat or a cold heat, and (iii) a second passage that is thermally connected to both of the first passage and the heat storage body, the second passage in which a second fluid flows. The heat storage body changes to a first phase in a solid state when a temperature of the heat storage body is lower than or equal to a phase transition temperature, and changes to a second phase in a solid state when the temperature of the heat storage body exceeds the phase transition temperature. The heat storage body stores or dissipates heat depending on a phase transition between the first phase and the second phase.

10 Claims, 4 Drawing Sheets

(51) Int. Cl.
*F28D 1/053* (2006.01)
*F28D 20/00* (2006.01)
*F28D 21/00* (2006.01)
*C09K 5/06* (2006.01)

(52) U.S. Cl.
CPC ..... *F28D 1/05383* (2013.01); *F28D 20/0056* (2013.01); *F28D 20/025* (2013.01); *F28D 2020/0013* (2013.01); *F28D 2021/0068* (2013.01); *F28D 2021/0085* (2013.01); *Y02E 60/142* (2013.01); *Y02E 60/145* (2013.01)

(58) Field of Classification Search
CPC ............... F28D 2020/013; F28D 2020/006; F28F 7/02; B60H 1/00335; B60H 1/005; B60H 1/3204; C01P 2006/36; C09K 5/00; C09K 5/02; C09K 5/08; C01G 31/02; Y02E 60/142; Y02E 60/145
USPC ......................................................... 165/10
See application file for complete search history.

(56) References Cited

U.S. PATENT DOCUMENTS

| | | | | |
|---|---|---|---|---|
| 7,891,412 | B2* | 2/2011 | Loup | B60H 1/005 |
| | | | | 165/10 |
| 2010/0018231 | A1* | 1/2010 | Haller | F28D 20/02 |
| | | | | 62/238.6 |
| 2010/0065244 | A1* | 3/2010 | Yokoyama | F28D 1/05383 |
| | | | | 165/10 |
| 2011/0286724 | A1* | 11/2011 | Goodman | F24H 7/0466 |
| | | | | 392/346 |
| 2012/0204597 | A1* | 8/2012 | Karl | F25B 39/022 |
| | | | | 62/529 |
| 2014/0069136 | A1* | 3/2014 | Lim | F28D 20/02 |
| | | | | 62/434 |
| 2014/0074314 | A1* | 3/2014 | Niknafs | F28D 20/0056 |
| | | | | 700/300 |
| 2015/0060006 | A1* | 3/2015 | Watremetz | F28D 17/02 |
| | | | | 165/10 |

* cited by examiner

HEAT EXCHANGER

CROSS REFERENCE TO RELATED APPLICATIONS

This application is a U.S. National Phase Application under 35 U.S.C. 371 of International Application No. PCT/JP2015/002345 filed on May 8, 2015 and published in Japanese as WO 2015/177977 A1 on Nov. 26, 2015. This application is based on and claims the benefit of priority from Japanese Patent Application No. 2014-106784 filed on May 23, 2014. The entire disclosures of all of the above applications are incorporated herein by reference.

TECHNICAL FIELD

The present disclosure relates to a heat exchanger applied to a cold heat exchanger for a refrigeration cycle.

BACKGROUND ART

Conventionally, a refrigeration cycle is used in an air conditioner. It is considered to perform a specific cooling operation on a condition that the refrigeration cycle is stopped. For example, a compressor in the refrigeration cycle is driven by an engine for moving a vehicle in a vehicle air conditioner. The refrigeration cycle is thereby stopped when the engine is stopped while the vehicle is stopping moving temporarily.

For a purpose of performing a specific cooling operation while the vehicle is stopping moving, it is disclosed that a heat exchanger has a cold heat storage body storing a cold heat in an evaporator disposed in the refrigeration cycle (refer to e.g., Patent Literature 1). The heat exchanger disclosed in Patent Literature 1 has, as a cold heat storage body, a solid-liquid phase transitional latent heat storage body.

PRIOR ART LITERATURES

Patent Literature

Patent Literature 1: JP 2014-20758 A

SUMMARY OF INVENTION

However, according to studies conducted by the inventors of the present disclosure, it is necessary to dispose a case housing a heat storage body other than components (e.g., a tube, a fin, a tank etc.) configuring the heat exchanger for a purpose of suppressing a leak of a heat storage body in a liquid state, in a case that the solid-liquid phase transitional latent heat storage body.

In addition, a size variation range of the heat storage body in the case becomes greater since a density variation range of the heat storage body is large during a phase transition between a solid phase and a liquid phase. The case thereby should have a space for the size variation of the heat storage body caused in conjunction with the phase transition such that the case is fully filled with the heat storage body.

According to the above-described structure, heat is transferred in an order of the heat storage body, the case, a refrigerant passage, and an air passage when a cold heat is dissipated from the heat storage body to the air passage that is a heat transfer target. A great thermal resistance is thereby caused between the heat storage body and the case and between the case and the tube (i.e., the refrigerant passage). As a result, the thermal resistance in the heat dissipation may become large in an entirety of the heat exchanger.

Moreover, a supercooling may be caused due to the phase transition while the heat storage body is storing cold heat in a case that the solid-liquid phase transitional latent heat storage body is used as the heat storage body. The heat storage body therefore tends not to be solidified due to the supercooling even in a case that the heat storage body stores cold heat at an assumed phase transitional temperature (i.e., an equilibrium melting point). As a result, the heat storage body may not be able to store cold heat sufficiently.

The present disclosure addresses the above issues, and thus it is an objective of the present disclosure to provide a heat exchanger having a heat storage body, which can reduce a thermal resistance from a heat storage body to a heat transfer target in a heat dissipation and can suppress a supercooling in a heat storage.

A heat exchanger of the present disclosure has a first passage, a heat storage body, and a second passage, and performs a heat exchange between a first fluid and a second fluid. The first fluid flows in the first passage. The heat storage body is thermally connected to the first passage and stores a warm heat or a cold heat. The second passage is thermally connected to both of the first passage and the heat storage body, and the second fluid flows in the second passage. The heat storage body changes to a first phase in a solid state when a temperature of the heat storage body is lower than or equal to a phase transition temperature, and changes to a second phase in a solid state when the temperature of the heat storage body exceeds the phase transition temperature. The heat storage body stores or dissipates heat depending on a phase transition between the first phase and the second phase. The second passage is formed in the heat storage body integrally with the heat storage body.

According to the above-described configuration, the heat storage body does not change from the liquid state to the solid state in a heat storage since the heat storage body stores or dissipates heat depending on the phase transition between the first phase and the second phase. The supercooling thus can be suppressed in the heat storage.

Moreover, the heat storage body is kept in a solid state both in the first phase and the second phase since the heat storage body stores or dissipates heat depending on the phase transition between the first phase and the second phase. The second passage thus can be formed in the heat storage body integrally with the heat storage body.

A heat can be transferred from the heat storage body directly to the first passage, i.e., the heat transfer target, in the heat dissipation since a case to house the heat storage body is not necessary. As a result, there is no heat resistance between the heat storage body and the case and between the case and the second passage in the heat dissipation. The heat resistance thereby can be reduced when the heat storage body dissipates heat to the heat transfer target.

"The heat storage" mentioned in the present disclosure includes a meaning of storing a cold heat not only storing a heat having a high temperature. "The heat dissipation" mentioned in the present disclosure includes a meaning of dissipating a cold heat not only dissipating a heat having a high temperature.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
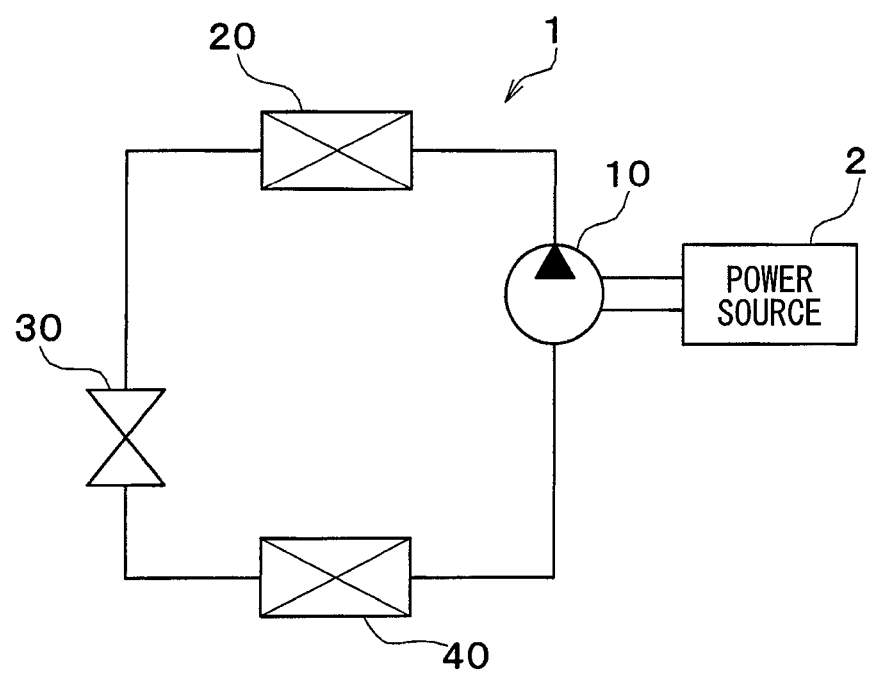
FIG. 1 is a diagram illustrating a configuration of a refrigeration cycle configuring a vehicle air conditioner according to a first embodiment.

A first embodiment will be described hereafter referring to FIG. 1 through FIG. 4. FIG. 1 shows a configuration of a refrigeration cycle device configuring a vehicle air conditioner. The refrigeration cycle device 1 configuring the vehicle air conditioner has a compressor 10, a radiator 20, a pressure reducer 30, and an evaporation device (i.e., an evaporator) 40. The components are connected to each other in a circle by a pipe and configure a refrigerant circulation passage.

The compressor 10 is driven by an internal combustion engine (or a device such as an electric motor) that is a power source 2 for moving a vehicle. The compressor 10 is stopped when the power source 2 is stopped. The compressor 10 draws refrigerant from the evaporator 40 and discharges the refrigerant to the radiator 20 after compressing the refrigerant. The radiator 20 cools a high-temperature refrigerant. The radiator 20 is also referred to as a condenser. The pressure reducer 30 reduces a pressure of the refrigerant after being cooled in the radiator 20.

The evaporator 40 evaporates the refrigerant of which pressure is reduced in the pressure reducer 30, and cools air (referred to as an inside air hereinafter) inside a vehicle compartment. That is, the evaporator 40 is a heat exchanger that cools the inside air by performing a heat exchange between the inside air (i.e., a first fluid) and the refrigerant (i.e., a second fluid). The inside air thus corresponds to the first fluid of the present disclosure, and the refrigerant thus corresponds to the second fluid of the present disclosure.

In other words, the evaporator 40 is a cold heat storage heat exchanger that stores a cold heat in a heat storage body 41 (refer to FIG. 2) when exerting a heat absorption effect by evaporating the refrigerant in the evaporator 20, and that dissipates the cold heat stored while the compressor 10 is being stopped, i.e., while the power source is being stopped.

The evaporator 40 has a core part 43 and a pair of header tanks 44. The core part 43 is configured by more than one of the heat storage body 41 and fins 42 that are stacked alternately such that one fin 42 is disposed between adjacent two of the heat storage portions 41. An air passage 45, as the first passage in which the inside air flows, is formed between the adjacent two of the heat storage portions 41, i.e., in a portion in which the fin 42 is disposed. The heat storage body 41 and the air passage 45 are thermally connected to each other.

The heat storage body 41 is formed to have a flat shape such that a flow direction or the inside air (referred to as an airflow direction hereinafter) coincides with a major axis direction of the heat storage body 41. More than one of the heat storage body 41 are arranged side by side in the vertical direction to be parallel to each other, and a longitudinal direction of the heat storage body 41 coincides with the horizontal direction.

Figure 3:
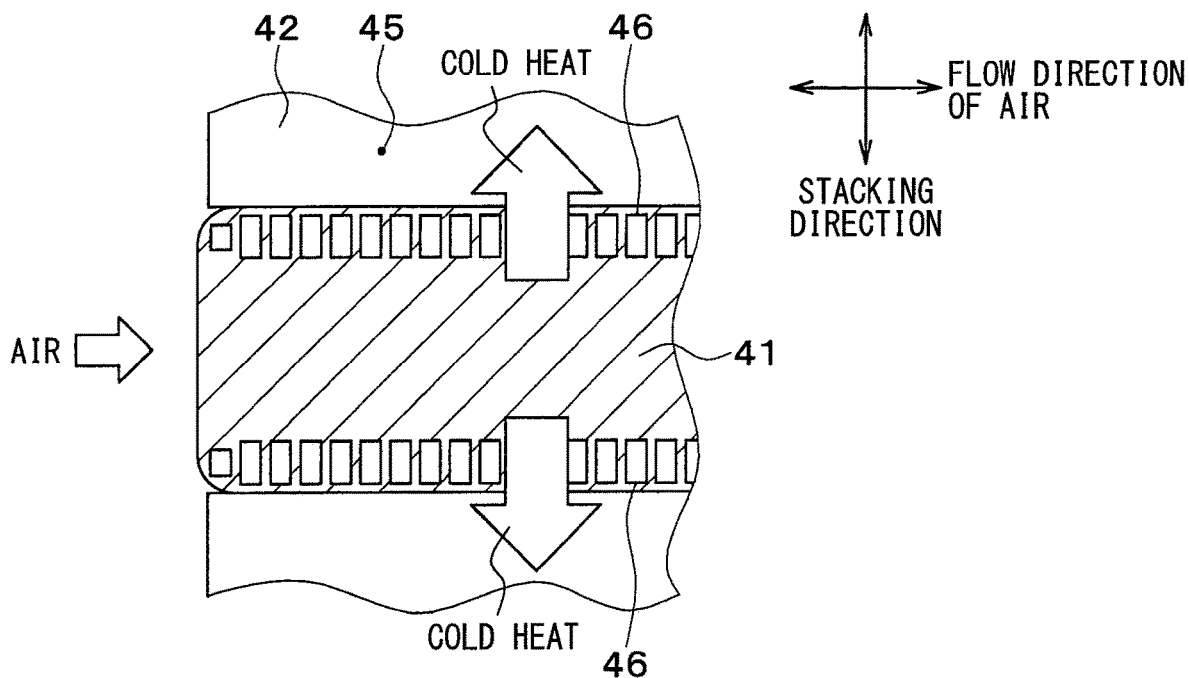
FIG. 3 is a cross-sectional view taken along a line III-III shown in FIG. 2.

As shown in FIG. 3, the heat storage portion 41 changes to a first phase in a solid state when a temperature of the heat storage portion 41 is lower than or equal to a phase transitional temperature, and changes to a second phase in a solid state when the temperature of the heat storage portion 41 exceeds the phase transitional temperature. That is, the heat storage body 41 is made of a material that is kept in a solid state both in the first phase and the second phase. The heat storage body 41 of the present embodiment stores or dissipates heat depending on a phase transition between the first phase and the second phase. The material making the heat storage body 41 will be described in detail later.

More than one of a refrigerant passage 46, as a second passage in which the refrigerant flows, are provided inside the heat storage body 41. The more than one of the refrigerant passage 46 is formed in the heat storage body 41 integrally with the heat storage body 41. The refrigerant evaporates in the refrigerant passage 46 when a heat exchange is performed between the refrigerant and the inside air.

The refrigerant passage 46 is formed by a through-hole provided in the heat storage body 41 according to the present embodiment. The more than one of the refrigerant passage 46 are arranged in the airflow direction in an area of the heat storage body 41 adjacent to the air passage 45. That is, the more than one of the refrigerant passage 46 are arrange in the airflow direction in the heat storage body 41 on both sides in a stacking direction of the heat storage body 41 (referred to as the stacking direction hereinafter). Each of the more than one of the refrigerant passage 46 has a rectangular shape in cross section.

The air passage 45 is arranged between adjacent two of the heat storage bodies 41 as described above. That is, more than one of the air passage 45 are arranged to be distanced from each other. The refrigerant passage 46 is arranged between adjacent two of the air passages 45 since the refrigerant passage 46 is formed in the heat storage body 41 integrally with the heat storage body 41. The refrigerant passage 46 is thermally connected to both of the air passage 45 and the heat storage body 41.

Figure 2:
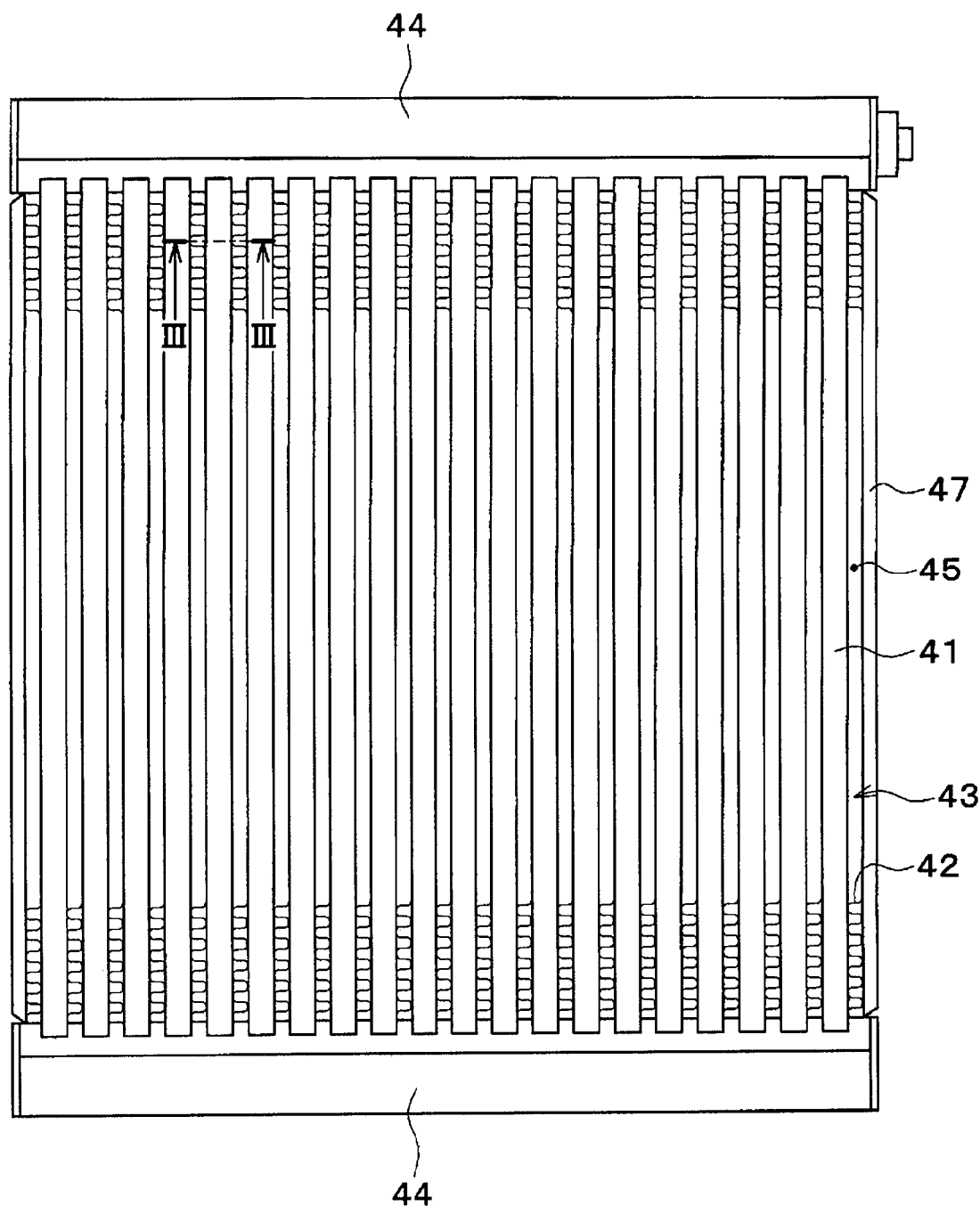
FIG. 2 is a planar view illustrating an evaporator according to the first embodiment.

As shown in FIG. 2, the fin 42 is formed to have a corrugate shape and coupled with a flat surface of the heat storage body 41 on both sides of the heat storage body 41. The fin 42 increases a heat transfer area that is in contact with the inside air, and promotes a heat exchange between the inside air and the refrigerant flowing in the refrigerant passage 46 provided in the heat storage body 41.

The pair of header tanks 44 are located on both end of the heat storage body 41 in the longitudinal direction and extend in a direction perpendicular to the longitudinal direction. The pair of header tanks 44 communicate with the refrigerant passage 46 provided in the heat storage body 41. The header tanks 44 of the present embodiment are arranged on an upper end and a lower end of the heat storage body 41, and extend in the horizontal direction. The header tanks 44 communicate with the refrigerant passages 46 of each of the heat storage bodies 41.

A side plate 47 is provided in each end of the core part 43 in the stacking direction to reinforce the core part 43. The side plate 47 extends parallel to the longitudinal direction, and both end of the side plate are connected to the pair of the header tank 44 respectively.

The evaporator 40 of the present embodiment has the heat storage body 41 that store cold heat as described above. The vehicle air conditioner of the present embodiment thus can be switched between a cold heat dissipation mode in which cold heat stored in the heat storage body 41 is transferred to the inside air that is a cooling target fluid and a cold heat storage mode in which cold heat in the refrigerant that is a cold heat source is stored in the heat storage body 41.

The compressor 10 in the refrigeration cycle device is driven by the power source 2 for moving the vehicle when the vehicle is moving. The inside air is cooled by a heat exchange between the inside air and the refrigerant performed in the evaporator 40, and thereby the vehicle compartment is cooled. The cold heat storage mode is performed on this occasion, and therefore the cold heat in the refrigerant is stored in the heat storage body 41.

On the other hand, the refrigeration cycle device is stopped when the power source 2 for moving the vehicle is stopped while the vehicle is being stopped temporarily. The cold heat dissipation mode is performed on this occasion, and a specific cooling operation is performed by supplying the cold heat stored to the heat storage body 41 to the inside air.

The material making the heat storage body 41 of the present embodiment will be described in detail hereafter. The heat storage body 41 is configured by a strongly correlated electron chemical compound that has strong coulomb interaction acting between electrons configuring the material.

The strongly correlated electron chemical compound configuring the heat storage body 41 is a compound, e.g., vanadium dioxide, including at least a transition metal and oxygen according to the present embodiment. The strongly correlated electron chemical compound configuring the heat storage body 41 may be a chemical compound expressed by the following chemical formula (1).

$$M_{1-x}N_xO_y \quad (1)$$

M and N in the chemical formula (1) are transition metals different from each other, and x and y satisfy relations of $0 < x \leq 0.5$ and $1.9 < y < 2.1$.

The M in the chemical formula (1) may be vanadium. The N in the chemical formula (1) may be one of tungsten, rhenium, molybdenum, ruthenium, niobium, and tantalum. The phase transitional temperature of the heat storage body 41 can be set at a required temperature by adding a specified amount of a metal element such as tungsten to vanadium dioxide.

In the evaporator 40 of the present embodiment, the heat exchange is performed between the inside air and the refrigerant, and the refrigerant evaporates in the refrigerant passage 46. The heat storage body 41 of the present embodiment is preferably a strongly correlated electron chemical compound in which the N in the chemical formula (1) is tungsten, and in which the x and the y in the chemical formula (1) satisfy relations of $0.02 < x < 0.03$ and $1.9 < y < 2.1$.

As described above, the heat storage body 41 of the present embodiment stores or dissipates heat depending on the phase change between the first phase and the second phase. The supercooling during a cold heat storage thereby can be suppressed since a phase of the heat storage body does not change from a liquid phase to a solid phase during the cold heat storage.

Moreover, the heat storage body 41 is kept in a solid state both in the first phase and the second phase since the heat storage body stores or dissipates cold heat depending on the phase transition between the first phase and the second phase. The refrigerant passage 46 therefore can be formed in the heat storage body 41 integrally with the heat storage body 41.

A heat can be transferred from the heat storage body 41 directly to the air passage 45, i.e., the heat transfer target, in cold heat dissipation since a case to house the heat storage body 41 is not necessary. As a result, there is no heat resistance between the heat storage body 41 and the case and between the case and the refrigerant passage 46 in the cold heat dissipation. The heat resistance thereby can be reduced when the heat storage body 41 dissipates cold heat to the heat transfer target. As a result, a cold heat output from the heat storage body 41 can be improved, and a blowing temperature of the evaporator 40 can be decreased.

Figure 4:
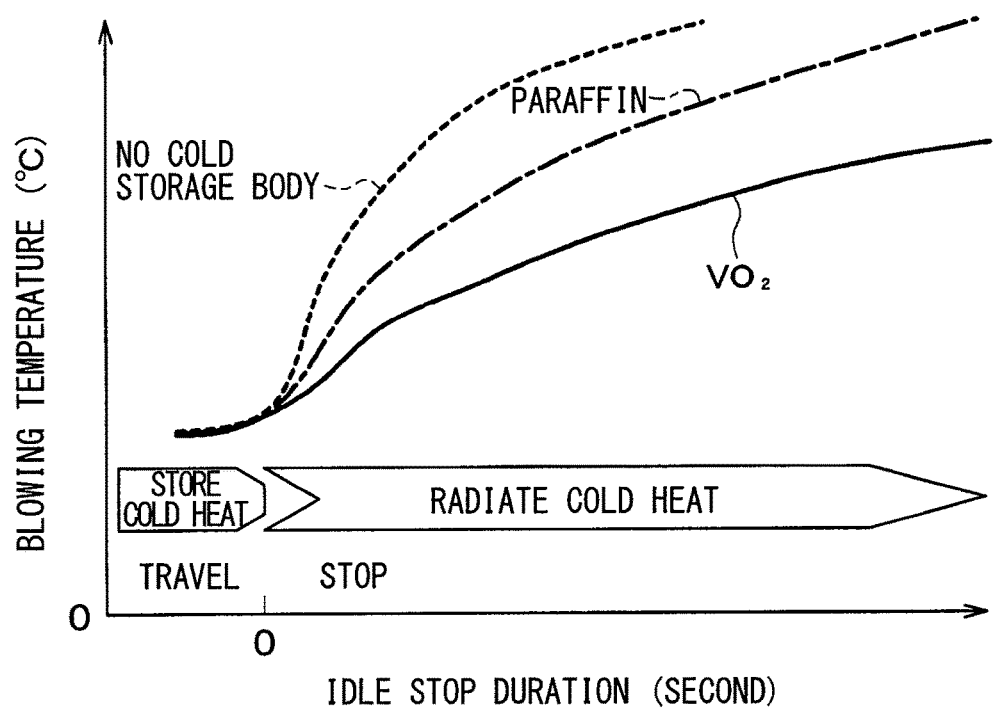
FIG. 4 is a characteristic chart illustrating a relation between an idle stop duration and a blowing temperature.

FIG. 4 shows a relation between an idle stop duration of the vehicle and a blowing temperature of air blowing from the evaporator 40. As obvious from FIG. 4, the evaporator 40 of the present embodiment configuring the heat storage body 41 by vanadium dioxide can decrease the blowing temperature in the idle stop duration as compared to both a conventional evaporator having no cold heat storage body and a conventional evaporator using paraffin as a cold heat storage body. A rise of the blowing temperature can be restricted over a long time, and the idle stop duration can be extended.

Second Embodiment

Figure 5:
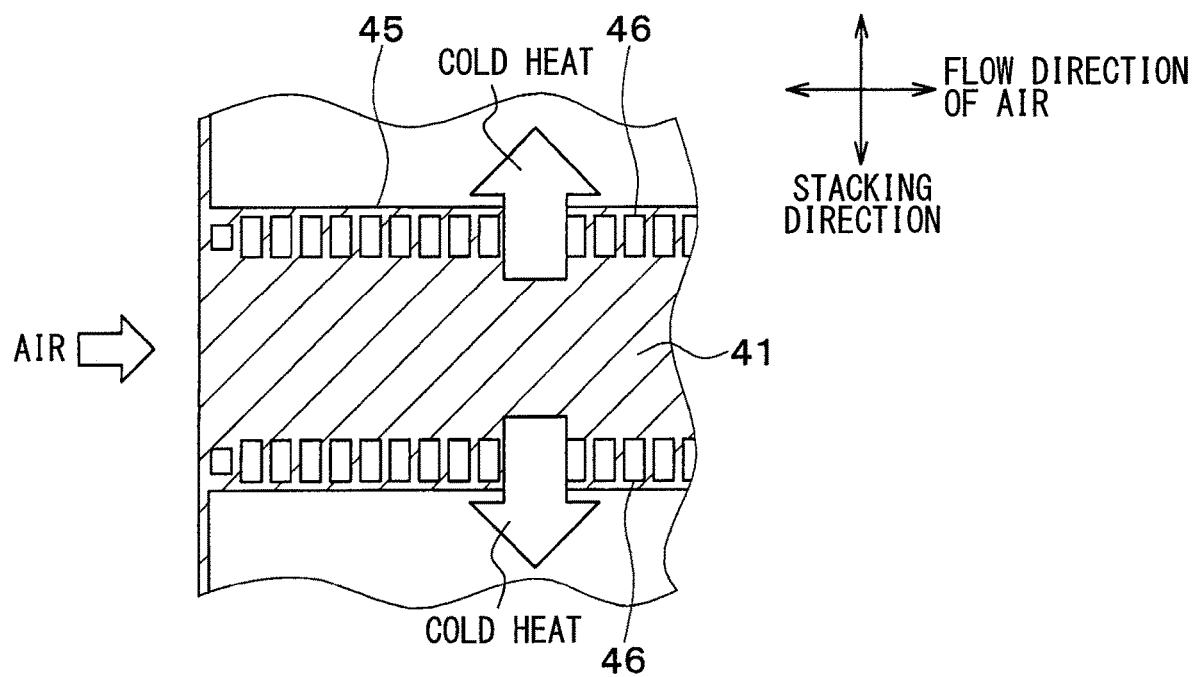
FIG. 5 is an enlarged cross-sectional view illustrating a neighborhood of a heat storage body according to a second embodiment.

A second embodiment of the present disclosure will be described hereafter referring to FIG. 5. As shown in FIG. 5, the air passage 45 of the present embodiment is formed integrally with the heat storage body 41. That is, both the refrigeration passage 46 and the air passage 45 are formed in the heat storage body 41 integrally with the heat storage body 41. Specifically, both the refrigeration passage 46 and the air passage 45 are formed in the heat storage body 41 integrally with the heat storage body 41 by providing a through-hole for the refrigeration passage 46 and a through-hole for the air passage 45 in the heat storage body 41.

Other configuration is the same as that of the first embodiment. According to the evaporator 40 of the present embodiment, a similar effect as the first embodiment can be acquired.

Other Modifications

It should be understood that the present disclosure is not limited to the above-described embodiments and intended to cover various modification within a scope of the present disclosure as described hereafter.

(1) According to the above-described embodiments, the refrigerant passage 46 has a rectangular shape in cross section, and more than one of the refrigerant passage 46 are arranged in the airflow direction in a portion of the heat storage body 41 adjacent to the air passage 45. However, the refrigerant passage 46 may have a circular shape in cross section. Alternatively, the refrigerant passage 46 may have a rectangular shape extending in the airflow direction in the cross section, and single refrigerant passage 46 may be arranged in the portion of the heat storage body 41 adjacent to the air passage 45.

(2) According to the above-described embodiments, the heat storage body 41 stores cold heat and is switchable between a cold heat dissipation mode in which cold heat stored in the heat storage body 41 is supplied to the inside air (i.e., the first fluid) and a cold heat storing mode in which cold heat of the refrigerant (i.e., the second fluid) in the heat storage body 41. However, for example, the heat storage body 41 may store heat having high temperature and may be switchable between a heat dissipation mode in which the heat having high temperature and stored in the heat storage body 41 is supplied to the first fluid and a heat storing mode in which the heat having high temperature and stored in the second fluid is stored in the heat storage body 41.

What is claimed is:

1. A heat exchanger comprising:
a first passage in which a first fluid flows;
a heat storage body that is thermally connected to the first passage and stores heat; and
a second passage that is thermally connected to the first passage and contained within the heat storage body, the second passage in which a second fluid flows in direct contact with the heat storage body, wherein
the heat exchanger is configured to perform a heat exchange between the first fluid and the second fluid,
the entire heat storage body is configured to change to a first phase that is in a solid state when a temperature of the heat storage body is lower than or equal to a phase transition temperature, and to a second phase in a solid state when the temperature of the heat storage body exceeds the phase transition temperature,
the heat storage body stores or dissipates heat depending on a phase transition between the first phase and the second phase,
the second passage is formed solely in the heat storage body itself integrally with the heat storage body,
the second passage is located at a top portion and a bottom portion along a periphery of the heat storage body,
the heat storage body includes a plurality of heat storage bodies,
the first passage includes a plurality of first passages, and
the plurality of heat storage bodies are arranged along a direction to be away from each other so that the plurality of heat storage bodies define the plurality of first passages therebetween.

2. The heat exchanger according to claim 1, wherein the first passage is formed integrally with the heat storage body.

3. The heat exchanger according to claim 1, wherein the heat storage body is configured by a strongly correlated electron chemical compound.

4. The heat exchanger according to claim 3, wherein the strongly correlated electron chemical compound includes at least a transition metal and oxygen.

5. The heat exchanger according to claim 4, wherein the strongly correlated electron chemical compound is a chemical compound expressed by a chemical formula of $M_{1-x}N_xO_y$, and
M and N in the chemical formula are transition metals different from each other, and x and y satisfy relations of $0<x0.5$ and $1.9<y<2.1$.

6. The heat exchanger according to claim 5, wherein the M in the chemical formula is vanadium, and
the N in the chemical formula is one of tungsten, rhenium, molybdenum, ruthenium, niobium, and tantalum.

7. The heat exchanger according to claim 6, wherein the first fluid is configured to be air,
the second fluid is configured to be a refrigerant for a refrigeration cycle,
the second fluid evaporates in the second passage,
the N in the chemical formula is tungsten, and
the x and the y in the chemical formula satisfy relations of $0.02<x<0.03$ and $1.9<y<2.1$.

8. The heat exchanger according to claim 1, wherein the second passage is contained entirely within the heat storage body.

9. The heat exchanger according to claim 1, wherein a fin is disposed in each of the plurality of first passages, and
the fin is in direct contact with both neighboring two of the plurality of heat storage bodies that define the corresponding first passage.

10. The heat exchanger according to claim 1, wherein the second passage includes a plurality of second passages, and
each of the plurality of second passages is a through hole passing through a respective one of the plurality of heat storage bodies.

* * * * *